June 8, 1937.   C. L. EKSERGIAN   2,083,327
TUBULAR VEHICLE WHEEL
Original Filed Oct. 8, 1934

INVENTOR.
CAROLUS L. EKSERGIAN.
BY
ATTORNEY.

Patented June 8, 1937

2,083,327

UNITED STATES PATENT OFFICE 2,083,327

TUBULAR VEHICLE WHEEL

Carolus L. Eksergian, Detroit, Mich., assignor to Budd Wheel Company, Philadelphia, Pa., a corporation of Pennsylvania Application October 8, 1934, Serial No. 747,372
Renewed November 5, 1936

3 Claims. (Cl. 301—5)

This invention relates to vehicle wheels and more particularly to metal wheels utilizing light weight rim structures and having a means strengthening the angles of the rim most subject to lateral spreading.

In modern high speed vehicle design the reduction in the weight of wheel bodies for the purpose of reducing polar moments of inertia, centrifugal forces and the unsprung weight utilizes very light gauge sheet metal parts which, because of very light gauge construction are inherently subject to weakness in other respects such as resistance to bending. It is desirable in avoiding this weakness while accomplishing the benefits of the reduction in weight to provide means unsubstantially affecting the weight of the wheel or effectively forming a truss or other form structure having great resistance to bending.

This application is one of a series of four relating to the same general subject matter, the other applications being Ser. Nos. 747,369, 747,370, and 747,371.

In Fig. 1 is illustrated in axial cross section one form of vehicle wheel incorporating the features of this invention.

Figure 1:
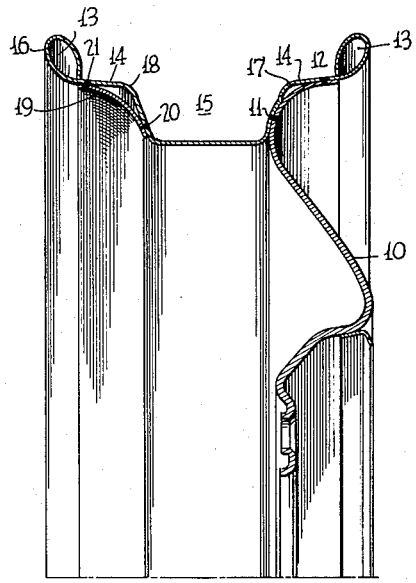

The construction embodying this invention utilizes essentially a disc type wheel body 10 secured to the rim preferably at two radially spaced zones 11 and 12, the rim being of the drop center type having hollow tubular side walls 13, tire bead seats 14 and drop center 15. The rim portion 16 of very light gauge sheet metal by the construction described provides a truss structural portion across the angle 17 between the tire bead seat and a side wall of the drop center through the intermediation of the wheel body 10. The opposite angle 18 is likewise bridged by annular member 19 secured by fastenings, for example, rivets or welding at the points 20 and 21. This resulting structure is essentially weak due to the very light gauge of the member 16, but as a result of the ultimate construction, this inherent weakness is entirely removed and the resulting structure is of great strength.

Figure 2:
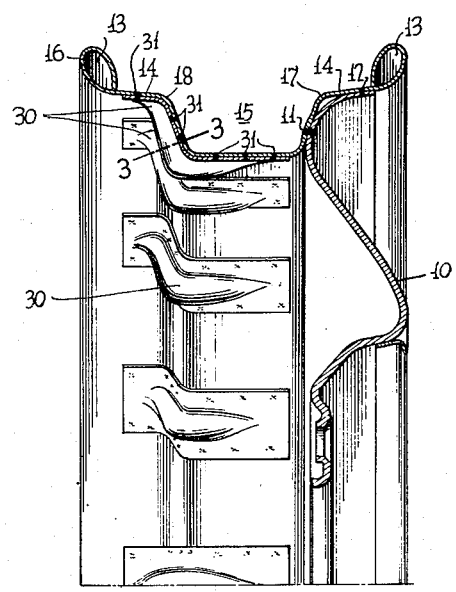
Fig. 2 illustrates a variation of the structure.
Figure 3:
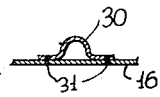
Fig. 3 illustrates a cross section on the line 3—3 of Fig. 2.

Due to forces exerted upon the rim member by the pressure within the tire, bending moments are created along the angles 22 tending to create a lateral spread of the rim. The hollow construction in the portions 13 preserves the shape of the rim member under conditions of tire deflation, and further resists the angularly operating forces of the tire pressure. From the hollow tubular cross sections between the rim and wheel body at one side and annulus 19, at the other, additional tubular members are created further stiffening the wheel construction against lateral spread additionally providing strength against radial and axially applied loads and the four such tubular elements being tied together by the tire base portion 15. By way of variation the structure of Fig. 2 is essentially similar to Fig. 1. Instead of the annulus 19 a corrugated annulus or a plurality of rib members 30 may be positioned with respect to the angle 18. These members or the angles may be welded at various points 31 to the rim creating a truss structure across the angle 18 and additionally providing transverse ribbing to further strengthen the wheel against torque and other loads of type created in making turns at high speed.

While by way of illustration and example I have described my invention in connection with a preferred embodiment thereof as to structure, and the preferred manner of practicing it, it will be obvious to those skilled in the art, after understanding the foregoing, that various changes and modifications may be made without departing from the spirit or scope of the invention and I aim in the appended claims to cover all such modifications and changes.

What I claim is:

1. A vehicle wheel comprising a sheet metal rim annulus of the drop center type having side walls extending from the base portion of the drop center and at an angle thereto, a tire bead seat extending laterally from the side walls, and a rim bead extending circumferentially outwardly from said bead seat, and a single disc type wheel body having a portion contacting and secured to a side wall and another portion contacting and secured to the adjacent tire bead seat at a point intermediate the juncture of the seat and said side wall and the rim bead, the intermediate portion of said wheel body between said side wall and tire bead seat extending across the angle between the side walls and tire bead seat and constituting a brace, and brace means on the opposite side of said drop center side wall and secured to it and to the tire bead seat and drop center base portion and tying together the angle between the seat and side wall.

2. A vehicle wheel comprising a sheet metal rim annulus of the drop center type having side walls extending from the base portion of the drop center and at an angle thereto, a tire bead seat extending laterally from the side walls, and a hollow rim bead extending circumferentially outwardly from said bead seat, and a single disc type wheel body having a portion contacting and secured to a side wall and another portion contacting and secured to the adjacent tire bead seat at a point intermediate the juncture of the seat and said side wall and the hollow rim bead, the intermediate portion of said wheel body between said side wall and tire bead seat extending across the angle between the side wall and tire bead seat and constituting a brace, said wheel body being secured to said side wall and to said tire bead seat at the points of contact, and brace means comprising an annulus on the opposite side of said drop center side wall and secured to it and to the tire bead seat and tying together the angle between the seat and side wall.

3. A vehicle wheel comprising a sheet metal rim annulus of the drop center type having side walls extending from the base portion of the drop center and at an angle thereto, a tire bead seat extending laterally from the side walls, and a hollow rim bead extending circumferentially outwardly from said bead seat, and a single disc type wheel body having a portion contacting and secured to a side wall and another portion contacting and secured to the adjacent tire bead seat at a point intermediate the juncture of the seat and said wall and the hollow rim bead, the intermediate portion of said wheel body between said side wall and tire bead seat extending across the angle common to the side walls, and tire bead seat and constituting a brace, and means tying together the opposite bead seat and side wall comprising a plurality of annularly spaced channel shaped members extending across the interior angle common to said bead seat and side wall and secured thereto at the points of contact with the bead seat, side wall and drop center base portion.

CAROLUS L. EKSERGIAN.